United States Patent [19]

Hotta

[11] 4,189,310
[45] Feb. 19, 1980

[54] APPARATUS FOR REMOVING OIL MIST
[75] Inventor: Shigeo Hotta, Osaka, Japan
[73] Assignee: Kabushiki Kaisha Sanetsu, Osaka, Japan
[21] Appl. No.: 871,589
[22] Filed: Jan. 23, 1978
[30] Foreign Application Priority Data Jan. 26, 1977 [JP] Japan ................... 52/8070

[51] Int. Cl.² ............................................. B01D 45/14
[52] U.S. Cl. ........................................ 55/317; 55/319; 55/323; 55/337; 55/396; 55/400
[58] Field of Search ................ 55/317, 319, 323, 327, 55/330, 337, 333, 396, 400, 423, 424

[56] References Cited
U.S. PATENT DOCUMENTS

| | | | |
|---|---|---|---|
| 1,789,717 | 1/1931 | Walker | 55/423 |
| 2,630,878 | 3/1953 | Hopper et al. | 55/319 |
| 3,289,397 | 12/1966 | Schonewald et al. | 55/400 |
| 3,633,343 | 1/1972 | Mark | 55/337 |
| 3,676,985 | 7/1972 | Foreman et al. | 55/400 |
| 3,676,987 | 7/1972 | Wunder et al. | 55/459 R |
| 3,763,631 | 10/1973 | Horn et al. | 55/400 |
| 3,791,105 | 2/1974 | Rhodes | 55/528 |
| 3,800,514 | 4/1974 | Avondoglio et al. | 55/400 |
| 3,857,687 | 12/1974 | Hamilton et al. | 55/337 |
| 3,860,403 | 1/1975 | Aoi | 55/319 |
| 3,933,643 | 1/1976 | Coluin et al. | 55/527 |

*Primary Examiner*—Frank W. Lutter
*Assistant Examiner*—Gregory N. Clements
*Attorney, Agent, or Firm*—Frank J. Jordan

[57] ABSTRACT

An apparatus for removing oil mist includes a cylindrical main body having an air inlet at one end and an air outlet at the other side thereof. A cylindrical rotatable filter having one end open to the air inlet and a centrifugal fan disposed concentrically within the filter and rotatable therewith are positioned within the main body. An oil adsorbent layer is provided on the inner surface of the main body surrounding the filter. The air taken in through the air inlet is passed through the filter into the air outlet causing air-borne oil mist to adhere to the filter. That oil mist which coalesces on the filter is centrifugally forced outward, is adsorbed by the oil adsorbent layer, and thereafter travels through the oil absorbent layer for discharge through an oil drain channel.

16 Claims, 6 Drawing Figures

APPARATUS FOR REMOVING OIL MIST

BACKGROUND OF THE INVENTION

This invention relates to a novel apparatus for removing oil mist, and more particularly to an apparatus incorporating an oil adsorbent layer for removing oil mist from an air stream with improved efficiency and without creating increased resistance to the air flow.

Oil mist removing apparatus heretofore known incorporate a fan which, when rotated, draws oil mist-containing air into a main body and passes the air through a rotating filter to cause the oil mist to adhere to the filter, such that when the particles of mist on the filter coalesce into oil droplets, the droplets are centrifugally forced outwardly against the inner peripheral wall of the main body by the rotation of the filter and are thereafter allowed to descend the wall and flow out of an oil outlet at the bottom of the wall.

The known apparatus, however, have the drawback that droplets of oil, while on the inner wall before reaching the outlet, are forced off the wall surface by the air pressure within the main body and are converted again into to a mist or vapor. This reduces the mist or vapor removal efficiency of the apparatus. To overcome the drawback, some apparatus include a second filter rearwardly of the rotatable filter and a third filter at the air outlet. Such apparatus, however, are complex and expensive in construction and require increased labor for maintenance and inspection as well as for the replacement of the filters. Moreover the provision of the second and third filters produces increased resistance to the air flow, consequently resulting in a reduction in the rate of air intake. With quantities of the oil mist adhering to the filters, a progressively decreasing removal efficiency will result, and a further reduction in the rate of air intake occurs. Thus a poor overall removal efficiency is inevitable.

SUMMARY OF THE INVENTION

An object of this invention is to provide highly efficient apparatus for removing oil mist.

Another object of this invention is to provide an apparatus in which the oil droplets captured by a filter can be reliably centrifuged therefrom without allowing the droplets to be converted to a mist or vapor again.

Another object of this invention is to provide an apparatus for removing oil mist from a stream of air without employing an increased number of filters and, therefore, without creating increased resistance to the air flow.

Another object of this invention is to provide an apparatus capable of treating an increased quantity of mist-containing air by virtue of reduced resistance to the air flow.

Another object of this invention is to provide an apparatus which is simple in construction and easy to maintain and inspect.

Other objects and advantages of this invention will become apparent from the following description given with reference to the accompanying drawings.

DESCRIPTION OF THE PREFERRED EMBODIMENTS

Figure 1:
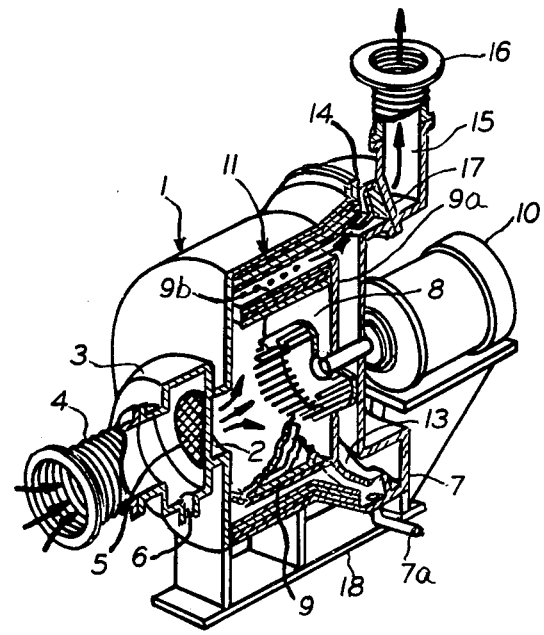
FIG. 1 is a perspective view partly in section and partly broken away showing an embodiment of this invention.
Figure 2:
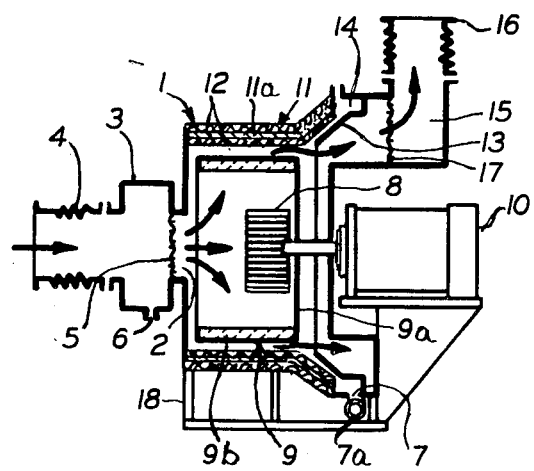
FIG. 2 is a side elevational view showing the apparatus of FIG. 1 in cross-section.
Figure 3:
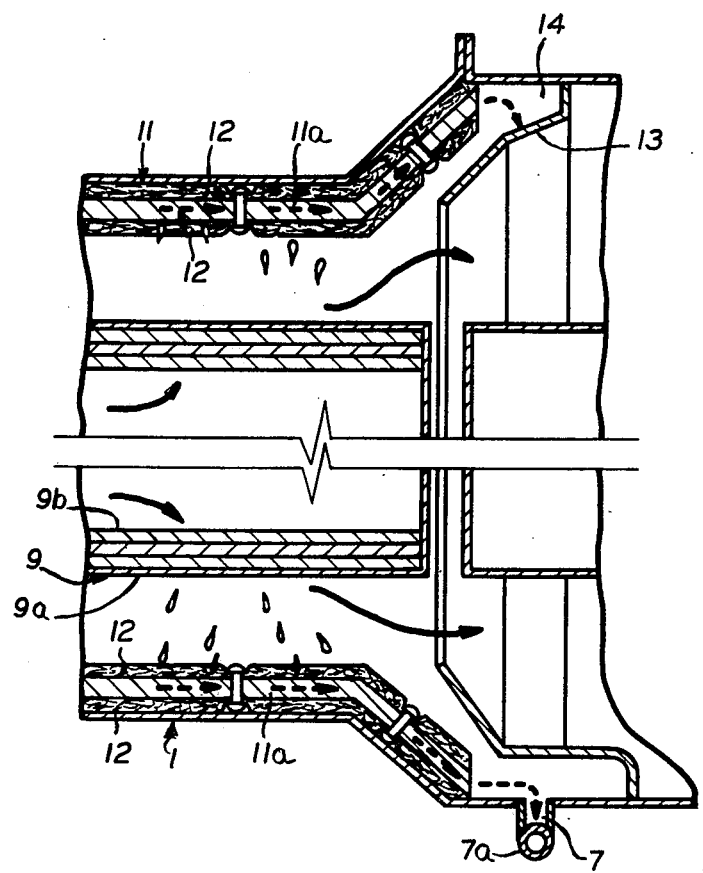
FIG. 3 is a fragmentary enlarged view of the discharge end of the apparatus of FIG. 1 in vertical cross-section showing particularly the oil adsorbent layer and oil drain channel.

With reference to FIGS. 1 to 3, the main body 1 of an oil mist removing apparatus is provided at one end with an air inlet 2 which is connected to an air intake duct 4 by a flow regulating chamber 3 interposed therebetween. A protective screen 5 for removing chips or like solid fragments from the entering air stream is positioned adjacent inlet 2. An auxiliary oil outlet 6 is provided in the bottom of the chamber 3 for removal of oil which deposits on the walls. A main oil outlet 7 is formed in the bottom wall of the main body 1, and an oil drain pipe 7a is provided for the discharge of the oil.

A sirocco fan 8 and a rotatable cylindrical filter 9 are concentrically arranged within the main body 1 and mounted on the shaft of a motor 10. The rotatable filter 9 comprises a perforated drum 9a and a triple filter layer 9b which lines such drum 9a.

An oil adsorbent layer 11 is provided over the entire inner peripheral wall of the main body 1 radially outwardly of the outer periphery of the rotatable filter 9. The oil adsorbent layer 11 comprises a main oil adsorbent member 11a made of a felt- or wad-like sheet of polypropylene fibers, pulp fibers or vegetable fibers and sandwiched between screen layers 12 of entangled thread or shred-like pieces of aluminum. The oil adsorbent layer 11 is attached to the inner peripheral wall of the main body 1. The main body 1 has a flared rear portion having a progressively increasing diameter toward its rear end. The oil adsorbent layer 11 conforms to the shape of the main body 1 and therefore also includes a flared rear portion.

To the rear of the oil adsorbent layer 11, a baffle 13 extends inwardly from the inner wall of the main body 1 over the entire periphery thereof at such an inclination such that the baffle 13 approximately conforms to the shape of the flared main body rear portion. The inner end portion of the baffle 13 extends into the flared portion of the oil adsorbent layer 11. The baffle 13 together with the inner portion of the main body 1 rearwardly of absorbent layer 11 defines an annular oil drain channel 14 which communicates with the oil outlet 7. The oil adsorbed by the layer 11 and passing therethrough is thus guided by the channel 14 circumferentially within channel 14 to the oil outlet 7. The oil can be reliably led to the oil outlet 7 because the interior of the oil drain channel 14 is protected by the baffle 13 from the force of the draft through the main body 1.

The main body 1 is provided at its rear end with an air outlet 15 from which an outlet duct 16 extends upwardly. An aluminum screen 17 is mount within either outlet 15 or duct 16. Indicated at 18 is a base for support of the apparatus.

The oil mist removing apparatus will operate in the following manner. An unillustrated hood attached to the front end of the intake duct 4 is in communication with a location where oil mist or vapor is given off. The motor 10 is driven to rotate the fan 8 and the rotatable filter 9. The fan 8, when rotated, draws oil mist-containing air through the duct 4 and flow regulating chamber 3 into the main body 1 as indicated by the solid-line arrows. Before entering the main body 1, the mist-containing air undergoes abrupt expansion in the chamber 3, with the result that some of the mist is removed from the air on adhesion to the wall of the chamber. The oil so deposited flows out of the apparatus through the auxiliary oil outlet 6 and an unillustrated pipe. The air drawn into the main body 1 passes through the rotatable filter 9 and is thereby cleaned and drawn off from the apparatus by way of the air outlet 15 and outlet duct 16.

The particles of oil mist adhering to the filter 9 coalesce to form droplets of certain size, whereupon the high-speed rotation of the filter 9 centrifugally forces the droplets against the oil adsorbent layer 11 lining the main body wall. Consequently the droplets are adsorbed by the main oil adsorbent member 11a through the screen 12 of entangled thread- or shred-like pieces of aluminum. When a quantity of the oil has been adsorbed by the oil adsorbent layer 11, the pressure of the air passing between the layer 11 and the filter 9 causes the oil to flow through the layer 11 in the direction of the stream of air. The capillarity of the adsorbent layer 11 assists the oil in flowing rearward while being retained in the layer 11. In this way, the oil flows through the adsorbent layer 11 as indicated by the dotted-line arrows in FIG. 3 and continuously enters the oil drain channel 14. The oil then flows through the channel 14 circumferentially of the main body to the oil outlet 7 and is drawn off from the main body 1 through the oil drain pipe 7a. The baffle 13, which protects the interior of the oil drain channel 14 against the influence of the draft, eliminates the likelihood that the oil flowing through the channel 14 will be forced out and converted into a mist again by the air pressure. Additionally the air pressure acting on the entrance of the oil drain channel 14 eliminates the likelihood that the oil on the upper portion of the baffle 13 sloping downwardly toward the entrance will descend the slope and drop from the opening. Thus the oil entering the drain channel 14 can be wholly reliably led to the oil outlet 7. Once adsorbed by the oil adsorbent layer 11, the oil is effectively retained in the layer 11 by the adsorbency of the layer 11 without being driven out by the air pressure. The screens 12 of thread- or shred-like pieces of aluminum provided over the opposite sides of the main oil adsorbent member 11a in the present embodiment also serve to prevent oil leakage even if the adsorbent member 11a should be impregnated with oil to saturation.

With the oil mist removing apparatus of this invention, the oil droplets forced out from the rotatable filter 9 can be led to the oil outlet 7 by the adsorbent layer 11 and drain channel 14 with almost 100% efficiency. In the case of conventional apparatus of the type in which oil droplets are adapted to flow down directly along the inner wall of the main body to the oil outlet, oil droplets will be forced away from the wall and converted to a mist while flowing, whereas the present apparatus is free of such objection and therefore achieves an exceedingly higher mist removal efficiency.

Incidentally, the apparatus of this invention was tested by a public research institute. The test results revealed that the present apparatus achieved an oil mist removal efficiency of 99.7% in contrast to 97.4% achieved by a conventional apparatus of the type in which oil droplets flow down directly along the wall of the main body even though such conventional apparatus employs second and third filters disposed to the rear of rotatable filter. The results also indicated that mist-containing air was treated at a rate of 97.8 Nm$^3$/min with the present apparatus, in contrast to the corresponding rate of 53.9 Nm$^3$/min achieved by the conventional apparatus.

The thickness, material and specific construction of the oil adsorbent layer 11 can suitably be determined in accordance with the concentration of mist to be treated. The aluminum screen 12 included in the oil adsorbent layer in the above embodiment need not always be provided.

Summarizing, in accordance with the embodiment of the present invention described above, the oil droplets driven out from the rotary filter are adsorbed by an oil adsorbent layer lining the peripheral wall of the main body and surrounding the filter, are then passed through the absorbent layer to an oil drain channel provided on the peripheral wall behind the adsorbent layer unaffected by the air pressure. The collected oil is thereafter led along the channel to an oil outlet. Consequently the oil droplets forced out from the rotatable filter can be wholly run off reliably, free of the drawback of the conventional apparatus in which oil droplets are likely to be forced into the air stream and reconverted to a mist by the air pressure while flowing down the peripheral wall of the apparatus. Thus the construction of the present invention ensures greatly improved mist removal efficiency also.

The improved efficiency eliminates the necessity of providing additional second and third filters as employed in conventional apparatus, thereby rendering the construction greatly simplified, inexpensive and easy to maintain and inspect. The simplified construction including no additional filters also serves to reduce the resistance to the air flow involved and results in an increased rate of air intake, consequently also contributing to a higher mist removal efficiency per unit time. These advantages combine to give a further improved overall removal efficiency.

Figure 4:
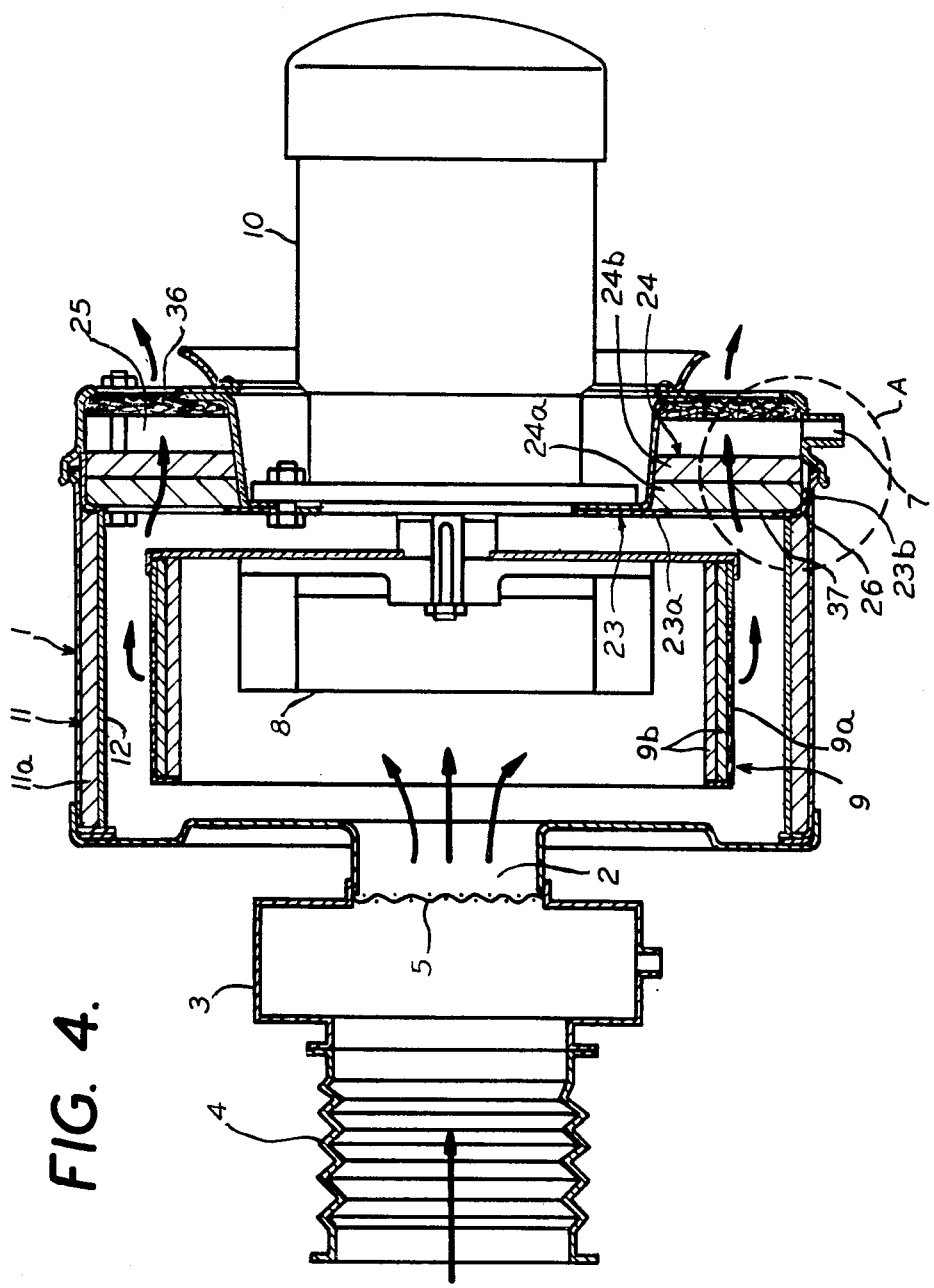
FIG. 4 is a side elevational cross-sectional view showing another embodiment of the apparatus of this invention.
Figure 5:
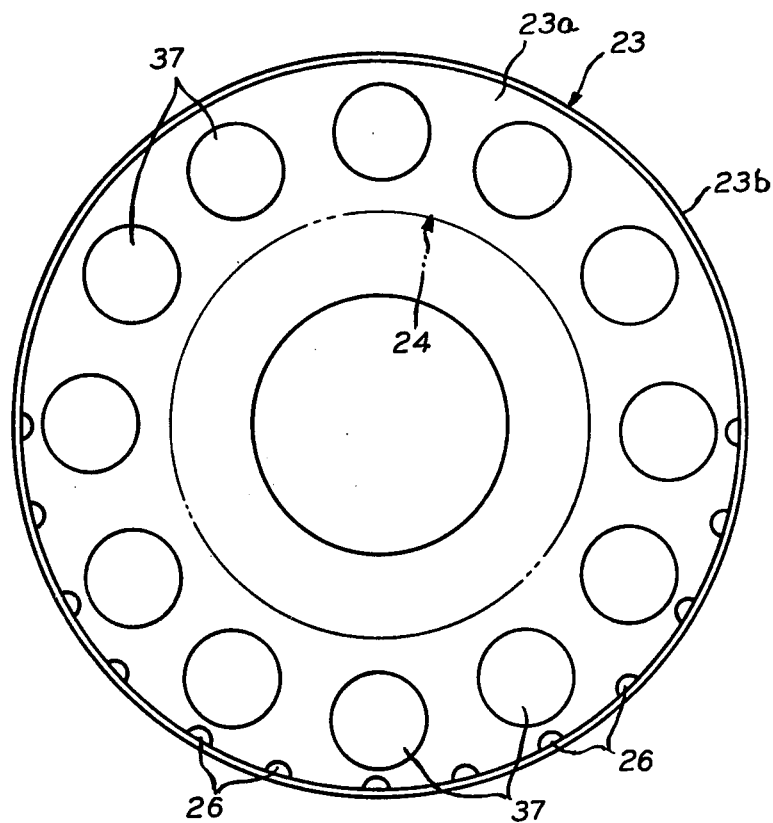
FIG. 5 is a rear end view showing a frame for mounting an auxiliary oil adsorbent layer.
Figure 6:
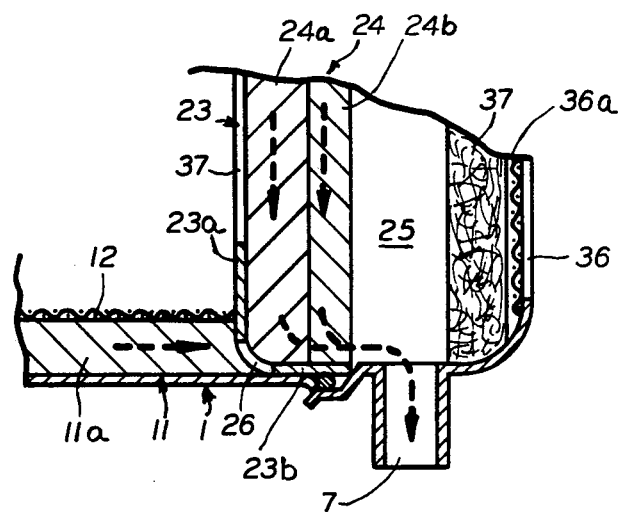
FIG. 6 is an enlarged fragmentary cross-sectional view showing the portion of the apparatus of FIG. 4 within the circled area indicated at A.

FIGS. 4 to 6 show another embodiment of this invention in which the main body 1 has an annular space 25 in the rear end portion thereof. A mounting frame 23 is attached to the main body 1 to define the front of the space 25. An auxiliary oil adsorbent layer 24 is fitted to the rear face of the mounting frame 23. The frame 23 comprises a main portion 23a in the form of an annular plate and a peripheral lip or flange portion 23b extending horizontally rearwardly from the outer periphery of the main portion 23a. The main portion 23a is in contact, at the front face of its outer periphery, with the rear end of a main oil adsorbent layer 11 comprising a main oil adsorbent member 11a and an iron screen 12. The main portion 23a of the frame 23 is formed with a number of air apertures 37 arranged at regularly spaced circumferential locations. The lower half of the mounting frame 23 is formed, at the junction portion between the main portion 23a and the horizontal peripheral portion 23b, with a plurality of circumferentially and regularly spaced oil drain ports 26. The auxiliary oil adsorbent layer 24 is composed of two superposed annular oil adsorbent members 24a and 24b each made of a felt- or wad-like sheet as of polypropylene fibers like the main member 11a of the oil adsorbent layer 11 previously described.

With the second embodiment, the mist-containing air taken in is passed through the rotatable filter 9 and then through the auxiliary oil adsorbent layer 24 and is thereby cleaned, whereupon the air exists through air outlet apertures 36 formed in the rear wall of the main body 1. Before entering the main body 1, the mist-containing air undergoes abrupt expansion in the chamber 3, with the result that some of the mist is removed from the air on adhesion to the wall of the chamber. The oil so deposited flows out of the apparatus through the auxiliary oil outlet 6 and an unillustrated pipe as described in connection with the first embodiment.

The particles of oil mist adhering to the filter 9 coalesce to form droplets of certain size, whereupon the high-speed rotation of the filter 9 centrifugally forces the droplets against the main oil adsorbent layer 11 lining the main body wall. Consequently the droplets are adsorbed by the main oil adsorbent member 11a through the iron screen 12. When a quantity of the oil has been adsorbed by the main oil adsorbent layer 11, the pressure of the air passing between the layer 11 and the filter 9 causes the oil to flow through the layer 11 in the direction of the stream of the air. The capillarity of the adsorbent layer 11 assists the oil in flowing rearwardly while being retained in the layer 11. The flow of the oil takes place in such a manner that the oil adsorbed by the main oil adsorbent layer 11 at or near its bottom portion will flow substantially straight rearwardly, while the oil on the upper portion of the adsorbent layer will move rearward while descending circumferentially of the main body under gravity, namely in a helical fashion. After passing through the main oil adsorbent layer 11 in this way, the oil flows through the oil drain ports 26 in the mounting frame 23 and then through the auxiliary oil adsorbent layer 24 circumferentially thereof or in the direction of its thickness and reaches the main body via an unillustrated oil drain pipe.

Once adsorbed by the main oil adsorbent layer 11, the oil is effectively retained in the layer by the adsorbency of the layer without being driven out by the air pressure. The same is true of the auxiliary oil adsorbent layer 24. The oil transferred from the main adsorbent layer 11 to the auxiliary adsorbent layer 24 always flows through the latter layer 24 into the main oil outlet 7. Thus the oil adsorbed by the main adsorbent layer 11 can be wholly reliably led to the main oil outlet 7 through which the oil is drawn off from the main body.

The auxiliary oil adsorbent layer 24, while guiding the oil from the main adsorbent layer 11 to the main oil outlet 7, also functions to adsorb the mist which advances through the main body without adhering to the rotatable filter 9 or the mist which has been converted from droplet form upon being released from the filter by the air pressure, thus leading the resulting oil droplets to the main oil outlet 7 along with the oil from the main adsorbent layer 11.

The oil drain ports 26 need not always be provided over the entire lower peripheral half of the main portion 23a of the frame 23 but may be formed only in the bottom portion of the frame 23 in a suitable number. The thickness and material of the oil adsorbent layers 11 and 24 can be determined as desired in accordance with the concentration of the oil mist to be treated.

According to this second embodiment of the invention, the oil droplets centrifuged from the rotary filter are adsorbed by the main oil adsorbent layer lining the peripheral wall of the main body surrounding the filter, are then passed through the absorbent layer and thereafter through an auxiliary adsorbent layer to an oil outlet. Consequently, the oil droplets forced out from the rotatable filter can be wholly run off reliably, free of the drawback of the conventional apparatus in which oil droplets are likely to be forced back into the air stream and reconverted to a mist by the air pressure while flowing down the peripheral wall of the apparatus. The mist which has cleared the rotatable filter can be captured by the auxiliary oil adsorbent layer and led to the oil outlet effectively. These features ensure greatly improved mist removal efficiencies over the conventional apparatus. Since the auxiliary adsorbent layer opposed to the air outlet apertures continuously guides the adsorbed oil to the oil outlet for discharge, the adsorbent means is not prone to early saturation with oil unlike conventional filters, thereby permitting the apparatus to retain a high and almost constant mist removal efficiency over a prolonged period of service, while the air intake is also maintained at a substantially constant rate during use.

What is claimed is:

1. Apparatus for removing oil mist from an air stream comprising:
    a main body having an air inlet at one end thereof for the admission of a stream of oil mist-containing air and an outlet at the other end for the discharge of substantially oil-free air;
    a cylindrical filter rotatably mounted within said main body;
    a centrifugal fan rotatably mounted within said cylindrical filter and coaxial with said cylindrical filter so as to be rotatable therewith;
    drive means for driving said cylindrical filter and said centrifugal fan, said fan being operable to take in air from said air inlet and cause oil-borne mist in said air to adhere to said cylindrical filter so that the oil mist on the cylindrical filter is centrifugally forced outwardly;
    a main oil adsorbent layer provided on the inner surface of said main body concentrically arranged radially outwardly of said cylindrical filter and extending axially of said main body such that said oil forced centrifugally outwardly from said cylindrical filter passes to said main oil adsorbent layer and is adsorbed by said main oil adsorbent layer without splashing; and
    an oil outlet means adjacent the downstream end of said main oil adsorbent layer and in communication therewith, said adsorbed oil in said main oil adsorbent layer flowing toward said oil outlet means due to the air passing between said main oil adsorbent layer and said cylindrical filter and due to the capillarity of said main adsorbent layer.

2. Apparatus according to claim 1, wherein said oil outlet means comprises a baffle element spaced radially inwardly from said main oil adsorbent layer to thereby form an annular oil drain channel therebetween, and an oil outlet conduit receiving oil from said channel for discharge from said main body.

3. Apparatus according to claim 2, wherein said main body and said main oil adsorbent layer flare outwardly as their downstream ends are approached, said baffle being flared to conform with the configuration of said oil adsorbent layer.

4. Apparatus according to claim 3, wherein said baffle and an interior partition in said main body define a passageway for the air stream, said passageway being separated from said channel by said baffle and in communication with said air outlet.

5. Apparatus according to claim 1 wherein said main oil adsorbent layer has a downstream end portion which tapers radially outwardly as the downstream end of the main oil adsorbent layer is approached, said oil outlet means comprising a baffle disposed radially inwardly of said downstream end portion of said main adsorbent layer to thereby define a channel between said baffle and said main body, said oil adsorbed by said adsorbent layer passing from said main adsorbent layer into said channel for discharge from said main body.

6. Apparatus according to claim 5 wherein said baffle tapers radially outwardly as the downstream end of the baffle is approached, said baffle and said channel being disposed downstream of said cylindrical filter.

7. Apparatus according to claim 5 wherein said baffle has a central air opening leading to an air outlet passageway, the air passing through said central air opening and said air outlet passageway prior to passing out through said air outlet, said baffle having its outer surface defining in part said channel and its inner surface defining in part said outlet passageway.

8. Apparatus according to claim 5 wherein the downstream end of said baffle is secured to said main body to thereby close off the downstream end of said channel.

9. Apparatus according to claim 1 wherein said oil outlet means comprises an oil outlet, said oil outlet means further comprising an auxiliary oil adsorbent layer positioned immediately downstream of said main oil adsorbent layer, said air passing from said cylindrical filter through said auxiliary oil adsorbent layer to said air outlet, said adsorbed oil in said main oil adsorbent layer passing to the downstream end of said main oil adsorbent layer and then to said auxiliary oil adsorbent layer, said adsorbed oil passing through said auxiliary oil adsorbent layer for discharge through said oil outlet.

10. Apparatus according to claim 9 wherein said oil outlet is located downstream of said auxiliary oil adsorbent layer.

11. Apparatus according to claim 1, further comprising an air duct and a flow regulating chamber of increased size interposed between said air duct and said air inlet, said chamber being dimensioned to effect expansion of the air entering same for removal of a portion of the oil contained in the air, an auxiliary oil outlet being connected to said chamber for the discharge of the oil so removed therewith.

12. Apparatus according to claim 1, wherein said main oil adsorbent layer comprises a wad-like fibrous sheet having interstices therein permitting the axial flow of adsorbed oil axially therethrough.

13. Apparatus according to claim 12, wherein said fibrous sheet is formed from polypropylene fibers.

14. Apparatus according to claim 12, wherein said fribrous sheet is formed from pulp fibers.

15. Apparatus according to claim 12, wherein said fibrous sheet is formed from vegetable fibers.

16. Apparatus for removing oil mist from an air stream comprising:
a main body having an air inlet at one end thereof for the admission of a stream of oil mist-containing air and an outlet at the other end for the discharge of substantially oil free air;
a cylindrical filter rotatably mounted within said main body;
a centrifugal fan rotatably mounted within said main body coaxial with said filter so as to be rotatable therewith, said centrifugal fan being mounted radially inwardly of said filter;
drive means for driving said filter and fan;
a main oil adsorbent layer provided on the inner surface of said main body concentrically arranged radially outwardly of said filter and extending axially of said main body to a location adjacent to but upstream of said air outlet;
an oil outlet adjacent the downstream end of said main oil adsorbent layer and in communication therewith for the discharge of oil centrifugally forced from said filter for the adsorption by said oil adsorbent layer and urged axially therethrough to the oil outlet;
an annular space adjacent the said other end of said main body and communicating with said air outlet; and
an annular mounting frame secured within said main body and within said annular space in said main body at the downstream end of said main oil adsorbent layer, an auxiliary oil adsorbent layer within said annular space positioned immediately downstream of said main oil adsorbent layer, said auxiliary oil adsorbent layer being fitted to said mounting frame, said mounting frame having a first plurality of circumferentially spaced openings therein for the passage of filtered air therethrough and through said auxiliary oil adsorbent layer to said air outlet, the lower portion of said mounting frame adjacent said main oil adsorbent layer and said auxiliary oil adsorption layer having a second plurality of openings serving as oil drain ports to permit the flow of oil from said main oil adsorbent layer to pass through said auxiliary oil adsorbent layer and thence to said oil outlet.

* * * * *